(12) United States Patent
Tse-Au

(10) Patent No.: US 6,816,456 B1
(45) Date of Patent: Nov. 9, 2004

(54) METHODS AND APPARATUS FOR NETWORK USE OPTIMIZATION

(75) Inventor: Elizabeth Suet Hing Tse-Au, Fair Haven, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/497,480

(22) Filed: Feb. 4, 2000

(51) Int. Cl.[7] .............................. H04J 3/16; H04L 12/56
(52) U.S. Cl. ................... 370/230.1; 370/235; 370/252; 370/395.21; 709/226; 709/232; 709/240
(58) Field of Search ............................. 370/230, 230.1, 370/231, 235, 235.1, 252, 253, 389, 395.1, 395.2, 395.21, 395.4, 395.41, 395.42, 395.43; 709/226, 230, 232, 234, 235, 238, 240

(56) References Cited

U.S. PATENT DOCUMENTS

| | | | |
|---|---|---|---|
| 5,199,027 A | | 3/1993 | Barri ........................... 370/60 |
| 5,347,511 A | * | 9/1994 | Gun ............................ 370/54 |
| 5,781,624 A | * | 7/1998 | Mitra et al. ................. 379/244 |
| 5,838,663 A | * | 11/1998 | Elwalid et al. ............. 370/233 |
| 5,978,356 A | * | 11/1999 | Elwalid et al. ............. 370/230 |
| 5,982,748 A | * | 11/1999 | Yin et al. ................... 370/232 |
| 6,058,102 A | * | 5/2000 | Drysdale et al. ............ 370/252 |
| 6,160,818 A | * | 12/2000 | Berger et al. ............... 370/468 |
| 6,240,066 B1 | * | 5/2001 | Nagarajan et al. .......... 370/230 |
| 6,331,986 B1 | * | 12/2001 | Mitra et al. ................. 370/468 |
| 6,463,470 B1 | * | 10/2002 | Mohaban et al. ........... 709/223 |

* cited by examiner

Primary Examiner—Alpus H. Hsu

(57) ABSTRACT

A method and apparatus for assessing network traffic loads, separating the network traffic into the traffic classes either with or without specific client priority/business input, and managing the allocation of available network resources based on the class of the traffic. Differentiated traffic classes of communication services, such as time sensitive and non-time sensitive, may be specified via a set of parameters to permit a network to provide corresponding services that result in a guaranteed amount of available network resources, such as bandwidth. The set of parameters allows the network operator to categorize each type of network traffic into traffic classes and designate a predetermined level of network resources per class, thereby achieving the QoS—Quality of Service—and predictable traffic service performance guarantee appropriate to the needs of the end users of the network in a multi-class, multi-priority network environment.

35 Claims, 8 Drawing Sheets

FIG. 7a  700

| Traffic Class 702 | Ancestor Class of the Traffic Class 704 | Bounded Variables of the Ancestor Class 706 | Allocated Value for Parent 708 | Bounded Variable for Parent 710 | Peak BW Utilization of Traffic Class (bps) 712 | Mean BW Utilization of Traffic Class (bps) 714 | αValue 716 | Bounded Variable for Traffic Class 718 | Allocated Bandwidth for Traffic Class (bps) 720 |
|---|---|---|---|---|---|---|---|---|---|
| Business Critical/Jitter Sensitive | Time Sensitive | F | N/A | N/A | N/A | N/A | N/A | N/A | N/A |
| Interactive/Delay Sensitive—DB Access | Time Sensitive | F | N/A | N/A | N/A | N/A | N/A | N/A | N/A |
| Retrieval – FTP | Non-Time Sensitive | T | ≥ 24822+5617 | F | X2 | Y2 | 0.5 | F | up to the parent's allocated limit |
| Messaging – Lotus | Non-Time Sensitive | T | ≥ 24822+5617 | F | X3 | Y3 | 0.5 | F | up to the parent's allocated limit |
| BU2 – Default TCP | Default | F | | | | | | | up to the parent's allocated limit |
| BU2 – Default UDP | Default | F | | | | | | | up to the parent's allocated limit |
| BU2 – Default Other Protocols | Default | F | | | | | | | up to the parent's allocated limit |

FIG. 76 750

| Traffic Class 752 | Ancestor Class of the Traffic Class 754 | Bounded Variables of the Ancestor Class 756 | Allocated Value for Parent 758 | Bounded Variable for Parent 760 | Peak BW Utilization of Traffic Class (bps) 762 | Average BW Utilization of Traffic Class (bps) 764 | αValue 766 | Bounded Variable for Traffic Class 768 | Allocated Bandwidth for Traffic Class (bps) 770 |
|---|---|---|---|---|---|---|---|---|---|
| Business Critical/ Jitter Sensitive | Time Sensitive | F | N/A | N/A | N/A | N/A | N/A | N/A | N/A |
| Interactive− DB Access | Time Sensitive | F | ≥ 40568 | F | X1 | Y1 | 0.7 | F | up to the parent's allocated limit |
| Retrieval − FTP | Non−Time Sensitive | T | ≥ 24822+5617 | F | X2 | Y2 | 0.5 | F | up to the parent's allocated limit |
| Messaging − Lotus | Non−Time Sensitive | T | ≥ 24822+5617 | F | X3 | Y3 | 0.5 | F | up to the parent's allocated limit |
| BU2 − Default TCP | Default | F | | | | | | | up to the parent's allocated limit |
| BU2 − Default UDP | Default | F | | | | | | | up to the parent's allocated limit |
| BU2 − Default Other Protocols | Default | F | | | | | | | up to the parent's allocated limit |

METHODS AND APPARATUS FOR NETWORK USE OPTIMIZATION

BACKGROUND OF THE INVENTION

1. Field of Invention

This invention relates to methods and apparatus for assessing network traffic and managing bandwidth allocation of a network.

2. Description of Related Art

Network communication systems are heavily relied on by businesses to transmit large amounts of information and data. The data traffic on such networks can be local traffic (i.e., traffic that originates and terminates within the company's network) or it can be external traffic (i.e., traffic which originates from outside of the company's network, such as an externally connected network, and terminates on or travels across the company's network). Local traffic can include intra-company communications such as e-mail, data transfers, file sharing and the like. External traffic can include customer request for information or services which the company offers, such as database searching, file transfers and the like. The large amount of data traffic on the network causes heavy loads to be placed upon the network resources, such as bandwidth. Accordingly, when the bandwidth required to transmit the data traffic over the network exceeds the bandwidth resources available on the network, the data traffic begins to become backed up which can result in communication delays or loss of data (e.g., traffic dropping due to congestion) over the network.

Currently, techniques for managing network resources for data traffic over a network exist wherein a total bandwidth available over a link, such as an output link, is not exceeded. For example, U.S. Pat. No. 5,199,027 issued to Barri discloses a communication switching system that includes a switching network with at least one switching element having a plurality of input links and at least one output link. The system further includes a processing means for calculating the total bandwidth used by virtual paths on the output link from individual bandwidth values contained in path setup cells used for setting up the virtual paths. However, the system only ensures that the total available bandwidth on the output link is not exceeded, and does not provide for differing allocation of network resources between different traffic classes.

SUMMARY OF THE INVENTION

The present invention is a scalable and flexible method and apparatus that can classify numerous network applications, such as Internet protocol (IP) network applications, into a finite number of traffic classes based on an assessment of the network. Once the network applications have been classified, the invention can apportion differing amounts of network resources, such as bandwidth, to the network applications of different traffic classes. Accordingly, the different traffic classes can travel across the network at differing levels of quality.

The present invention is a complete and cost-effective approach to provide differentiated quality of service for a network operator's critical traffic by traffic class priority. The invention does not require any prior knowledge of the network's traffic characteristic, but instead makes use of: 1) a method of questionnaire and interviewing to obtain necessary information from a network operator to start the traffic classification process; 2) public domain software to provide a cost-effective and non-intrusive traffic flow assessment; 3) an internally-developed traffic classification and bandwidth allocation strategy to make the task of traffic classification into different priority classes scalable; and 4) a set of transformation rules and associated transformation processes that automate the configuration of a bandwidth management tool to provide traffic differentiation, and thereby differing service qualities in a multi-class, multi-priority traffic environment. By doing so, the present invention displaces the need to employ people who must be skilled or have expertise in configuring and using the off-the-shelf technology.

The present invention is desirable since conventional methods suffer from one or more of the following problems. Many of the techniques for distributing network resources are not a complete service offering approach. A complete service offering approach means that the service offering can be started with no prior knowledge of customer network traffic characteristics. That knowledge can be grown over a sufficiently short time-interval (e.g., within 1 or 2 weeks), and be used to perform traffic classifications to provide different priority classes. Additionally, many of the current approaches are not scalable (i.e., not able to address a potentially large number of traffic applications). Current traffic management methods can also be inflexible (i.e., cannot work if the network operator's input is not available). Finally, current traffic management methods are not cost-effective since they do not make use of currently available public domain, non-intrusive measurement and reporting tools to perform traffic assessments in order to classify traffic and to report traffic characteristics.

The present invention provides methods and apparatus for assessing network traffic loads, separating the network traffic into the traffic classes either with or without specific client priority/business input, and managing the allocation of available network resources based on the class of the traffic. Differentiated traffic classes of communication services, such as time sensitive and non-time sensitive, may be specified via a set of parameters to permit a network to provide corresponding services that result in a guaranteed amount of available network resources, such as bandwidth. The set of parameters allows the network operator to categorize each type of network traffic into traffic classes and designate a predetermined level of network resources per class, thereby achieving the QoS—Quality of Service—appropriate to the needs of the end users of the network.

BRIEF DESCRIPTION OF THE DRAWINGS

The invention will be described with reference to the accompanied drawings, wherein like numerals reference like elements, and wherein:

FIGS. 7a and 7b are exemplary data structures for storing traffic classes and parameters of outbound and inbound traffic, respectively.

DETAILED DESCRIPTION OF PREFERRED EMBODIMENTS

The present invention provides a service provisioning method to assess a network traffic load and use the network traffic load to derive and implement a network use optimizing system to provide differentiated classes of service for a wide range of traffic flow. The method is based on an available amount of network resources and a traffic class that a particular data traffic type is assigned.

The method may be divided into three steps. The first step involves performing a traffic assessment by collecting the historical traffic data from a selected network or link and analyzing the historical data traffic. Analyzing the historical traffic data involves filtering out the "relevant" traffic. For example, if a client's input is available, then the relevant traffic is the traffic for which bandwidth must be guaranteed. Alternatively, if the client's input is not available, the relevant traffic can be the traffic which consumes the most bandwidth.

The second step involves grouping the filtered traffic into traffic classes and performing a traffic load calculation. The traffic load calculation generates traffic parameters for a particular traffic flow direction in each traffic class that should have a guaranteed bandwidth. The third and final step is to implement the traffic classes over the selected network or link based on the corresponding set of calculated parameters.

Figure 1:
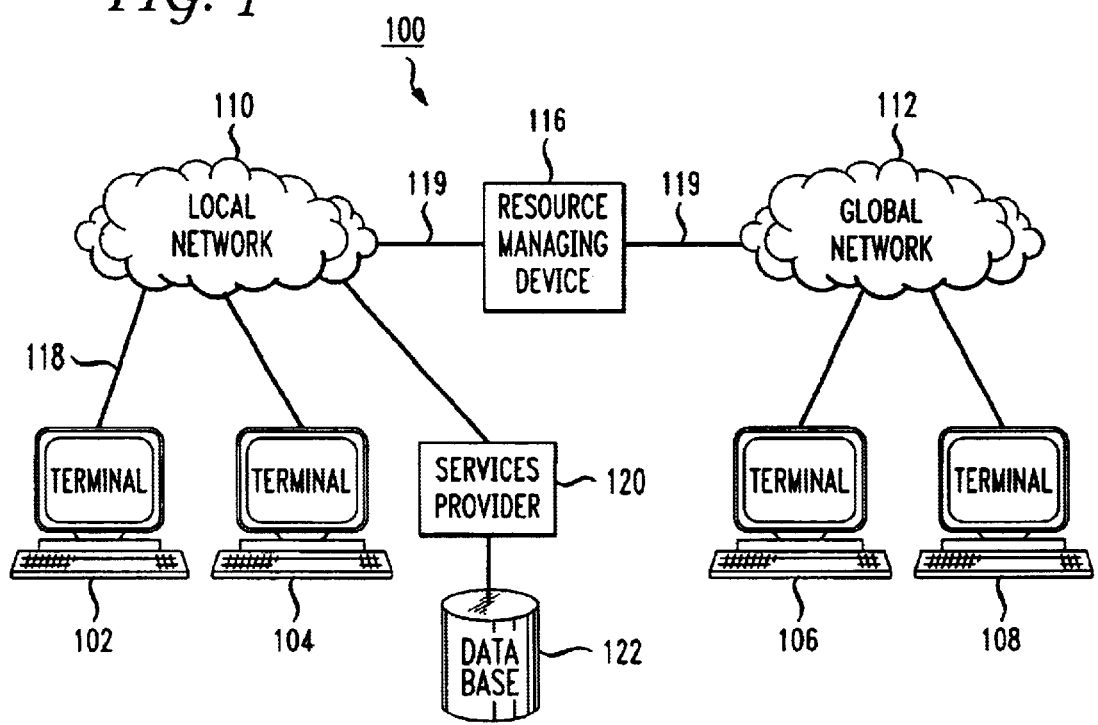
FIG. 1 is a block diagram of an exemplary network optimizing system in accordance with the present invention.

FIG. 1 is an exemplary block diagram of a network optimizing system 100. The system 100 includes a local network 110 and a global network 112 having a plurality of terminals 102–108 and/or service provider 120 in communication with the respective networks 110, 112 via communication links 118.

The system 100 further includes a resource managing device 116 interconnected between the local network 110 and the global network 112 via communication links 119. The resource managing device may perform network resource monitoring and control functions of the local network 110. Additionally, the resource managing device 116 can monitor and control the bi-directional data traffic between the global network 112 and the local network 110 over the communication links 119.

While the resource managing device 116 is shown as an independent unit coupled to both the local network 110 and the global network 112 it can also be incorporated in the terminals 102–104, or may be distributed throughout the local network 110. Any configuration that permits monitoring and control of the local network 110 and communication link 119 in order to allocate network resource to data traffic can be used without departing from the spirit and scope of the present invention.

The terminals 102–108 can be devices of any type that allow for the transmission and/or reception of communication signals. For example, terminals 102–108 can be land line telephones, cellular telephones, computers, personal digital assistants, video telephones, video conference apparatus, smart or computer-assisted televisions, Web TV and the like.

For the purposes of the following description of the present invention, it will be assumed that 1. terminals 102–108 are personal computers; and
2. the following definitions apply:

flow aggregate—any combination of the 5-tuples: source/destination IP addresses, source/destination port numbers, and protocol traffic class—an accumulation of at least two flow aggregates such that all of these flow aggregates receive an aggregated bandwidth allocation and attain similar quality of service (QoS) performance objectives under that class. Note that this definition is not restrictive in that a single flow aggregate can also be in a traffic class by itself.

traffic load—the average and peak bandwidth used by an IP traffic class.

The service provider 120 can be any device, such as a terminal 102–108, that is dedicated to providing service to terminals 102–104 connected with the local network 110 and/or terminals 106–108 connected with the global network 112. Services can include access to information that a company provides to its customers or to its employees, such as access to file services, electronic mail services, Web pages, computational resources and the like. The service provider 120 can also include a database of records 122 for storing large amounts of customer or employee information that can be readily accessed and provided at the request of the terminals 102–108.

Terminals 102–108 and service provider 120 are in communication with their respective networks 110, 112 over communication links 118 while the resource managing device 116 is connected to the local and global network 110, 112 by communication link 119. These communication links 118 and 119 may be any type of connection that allows the transmission of information. Some examples include conventional telephone lines, digital transmission facilities, fiber optic lines, direct serial/parallel connection, cellular telephone connections, satellite communication links, local area networks (LANs), Intranet and the like.

The local network 110 and the global network 112 may be single networks or a plurality of networks of the same or different types. For example, the networks 110, 112 may include a local telephone network (such as a Bell Atlantic network), in connection with a long distance network (such as a AT&T long distance network). Furthermore, the networks 110, 112 may be data networks or a telecommunication network in connection with a data network. Any combination of telecommunications and data networks may be used without departing from the spirit and scope of the present invention.

For the purposes of this application, it will be assumed that both the local and global networks 110, 112 are communication networks. The local network 110 can represent an enterprise data network, while the global network 112 represents a network which is externally connected with the local network 110, such as the Internet. For the purposes of this discussion, it can further be assumed that the communications link 119 represents a data communications channel on which the network resources, such as bandwidth, are to be managed by the resource managing device 116.

Figure 2:
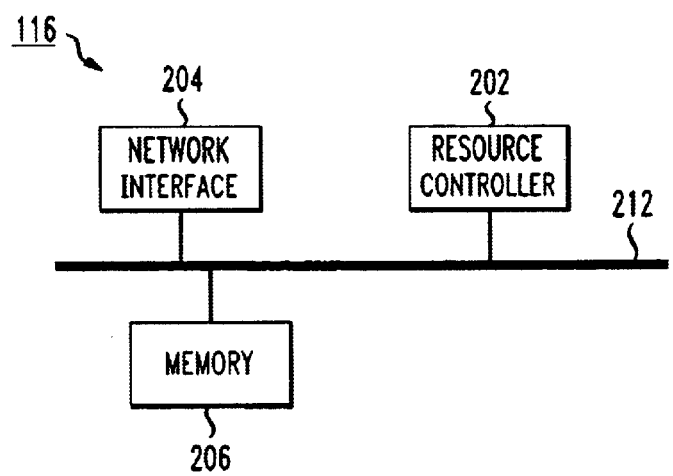
FIG. 2 is an exemplary block diagram of the resource managing device of FIG. 1.

FIG. 2 is a block diagram of the resource managing device 116. The resource managing device 116 may include a controller 202, a network interface 204, and a memory 206. The above components are coupled together via control/data bus 212. The above architecture is exemplary only. Other architectures of components may be used without departing from the spirit and scope of the present invention.

In operation, the resource controller 202 can monitor the data traffic on communication link 119 between the local and global communication networks 110, 112 via network interface 204. Furthermore, the resource controller 202 can identify which traffic class the data traffic belongs to based on the header information of the individual data packets within the data traffic. Additionally, the traffic class may be determined based on the direction of the traffic flow.

Once the traffic class is known, the resource controller 202 can access a set of predetermined parameters in order to apportion available network resource between the differing traffic classes. Accordingly, the resource controller 202 can dynamically allocate a particular amount of network resources to the data traffic of the differing traffic classes.

Prior to changing the operation of the system 100 into an optimized mode of operation, measurements of the traffic loads of the network can be taken and the various types of network traffic can be grouped into a plurality of traffic classes. The traffic classes can denote a hierarchy of the differing levels of criticality which data traffic in each of the traffic classes requires. For example, video phone data can be extremely time sensitive, while e-mail data can be time insensitive. Furthermore, the traffic classes are defined by the corresponding calculated traffic loads and an assigned α parameter, which is a weighing factor that accounts for the traffic class's sensitivity to delay. Both the traffic load parameters and a parameters are then used to apportion the network resources between the classes of traffic. All the above mentioned parameters are explained in greater detail below.

There are two ways in which the classes for the different types of data traffic are selected, depending on availability of client input during a client site visit for traffic assessment.

In a first method, if client input is available, traffic classes are selected through interview with the client to identify the types of traffic for which the client would like to have network resources guaranteed. Additionally, the traffic classes can also be done via questionnaires and surveys presented to the client. The questions are designed to efficiently gather information necessary to design a suitable system of traffic classes. An exemplary list of questions is shown in the Appendix A of this patent. For purposes of the following description, it will be assumed that a client interview took place, in which the client specified the data traffic that must have network resource guaranteed for a major business communication link.

Based on the conversation with the client, the functional nature of the traffic (e.g., file transfer, "trading", time-sensitive or non-time sensitive) and the direction for each (inbound, outbound or both) that must be guaranteed is determined, and is associated with specific combinations of the 5-tuples: source/destination IP addresses, source/destination ports, and protocol. The traffic is further segregated into a set of traffic classification categories based on the identified functionality. As shown below, based on the client input, the traffic of a particular business unit (BU) (i.e., sales department, accounting department or the like) can be separated into different traffic classes. For example:

Time-Sensitive Traffic:
    a. Database access traffic class: source IP address "135.16.108.115" (DB server address), destination client address range=215.100.108.98→118–large sized record retrieval
    →"Interactive" Class: alpha=0.7

Non-Time Sensitive Traffic:
    a. Any FTP traffic, source IP address "135.16.108.40", FTP server—file retrieval
    Any HTTP traffic, source IP address "135.16.108.116", web file download into this source IP address
    →"Retrieval" Class, alpha=0.5
    b. Lotus traffic, source and destination port #=1352, source IP address "135.16.108.74", destination IP address "220.18.110.41"
    →"Messaging" class, alpha=0.5

Default Traffic:
    a. (all other) Unclassified traffic
    →Unclassified "TCP"
    →Unclassified "UDP"
    →"Protocol Default"

During the interview, the client may also indicate their preference on performance criteria of certain applications. For example, the client may indicate that for non-time-sensitive traffic (for this BU), such as FTP and Lotus, performance would be satisfactory as long as there is enough bandwidth allocated to the FTP and Lotus applications. Information like those listed above: an organization's traffic list, application performance criteria, etc., are gathered through the interviewing process, and are then subsequently used to generate appropriate traffic classification and prioritization schemes for that client.

Figure 3:
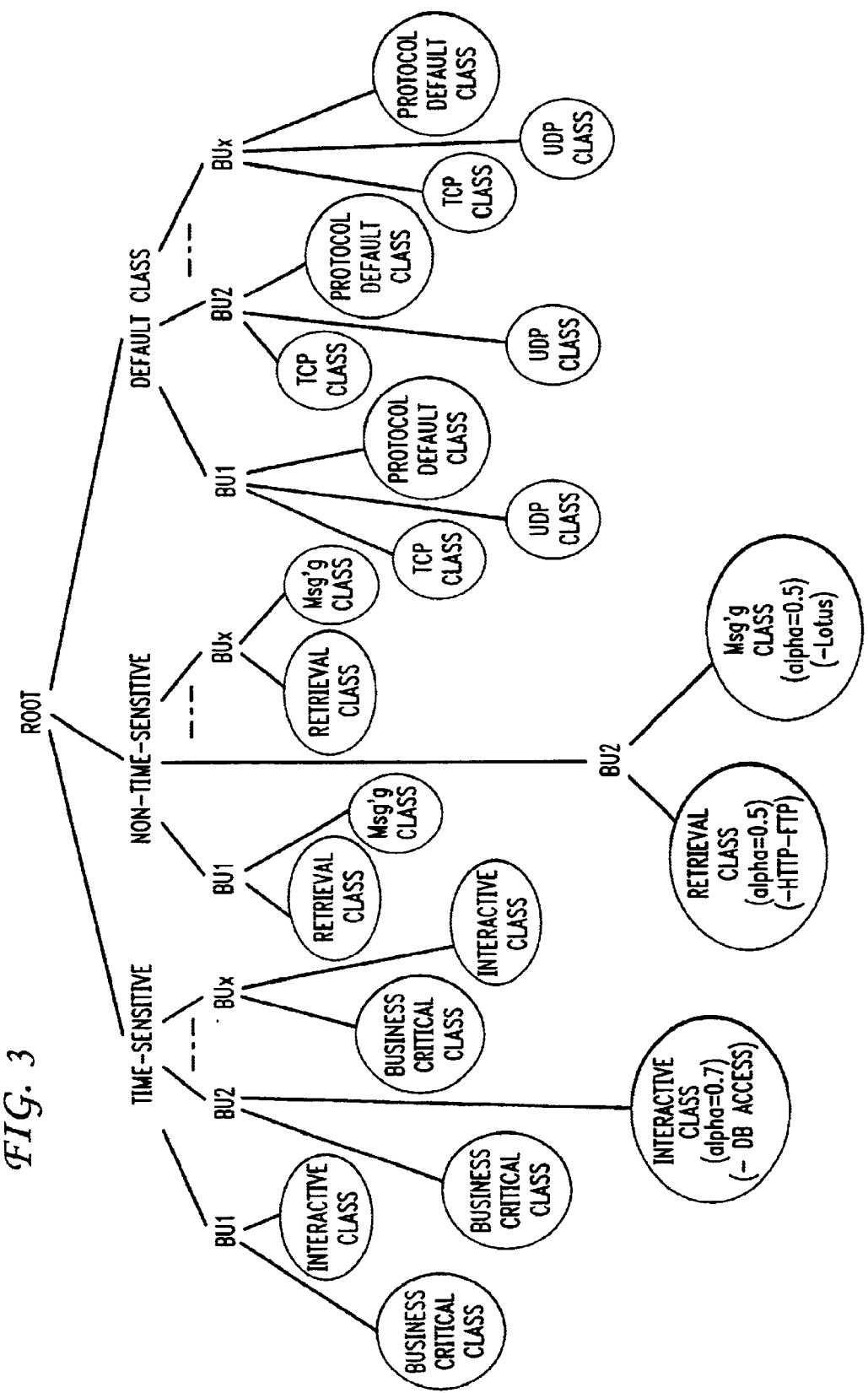
FIG. 3 is an exemplary class hierarchy tree for storing parameters related to traffic classes when client input is available.

FIG. 3 shows the above list converted into a customer-specific "Class Hierarchy Tree" format. As indicated in FIG. 3, a certain (could be physical) bandwidth of a communication link (i.e., indicated as the root) is segregated into three portions based on the interview process with the customer. The portions include a time-sensitive portion, a non-time-sensitive portion, and a default portion (a category that "catches everything else" that neither belongs to the time-sensitive or non-time-sensitive category). Each of these three categories is further separated into different organizations within the client's corporation (e.g., business units (BU1, BU2, BU3, . . . BUX)).

Underneath each node representing a BU within the time-sensitive category, two types of time-sensitive traffic classes are differentiated: business-critical/jitter-sensitive and interactive/delay-sensitive. Underneath each node representing a BU within the non-time-sensitive category, two types of non-time-sensitive traffic classes are differentiated: messaging and retrieval. Underneath each node representing a BU within the "default class", three types of default traffic classes are differentiated: TCP (covering all default or unclassified traffic using the TCP protocol), UDP (covering all the default or unclassified traffic using the UDP protocol), and protocol default (covering all default or unclassified traffic using all other protocols).

Each step of the categorization of traffic into different traffic types (i.e., into different traffic classes) is done in agreement with the customer during the interviewing process. Hence, from the interview, a customer traffic list such as that described above can easily be presented in the "class hierarchy tree" shown in FIG. 3. For the purposes of this disclosure, the traffic list above, the tree shown in FIG. 3, as well as client input on the performance criteria of certain applications for BU2 will be used as the basis for the development of an example situation in which client input is available.

According to the above list, under time-sensitive branch for BU2 resides the interactive class that corresponds to database access and has an α value of 0.7. Under the non-time-sensitive branch for the same organization, BU2, resides (a) the "retrieval" class that correspond to both the FTP traffic and the HTTP traffic, and has an α value of 0.5 each; and (b) the "messaging" class that corresponds to the Lotus traffic and has an α value of 0.5. Under the default class branch for BU2 resides the "unclassified TCP", "unclassified UDP" and "protocol default" classes that correspond to the default traffic of BU2.

In a second method, if client input is not available, the priority traffic classes are selected based on top bandwidth consuming "source" (vs. destination) ports. Note that top bandwidth consuming IP address pairs can also be used as the selection criteria. The number "X" of top bandwidth consuming source ports (or IP address pairs) that should be selected can be based on rules such as: the total number of ports (or address pairs) in use in the communication link. For example, if the number of ports is in the 100s or 1000s, X can be arbitrary chosen to be X=100, or if the number is in the 10s, X can be=10. Furthermore, for this scenario with no client input, a guideline of suggested α values could be used for assignment to different top-bandwidth consuming source ports (or IP address pairs).

Figure 4:
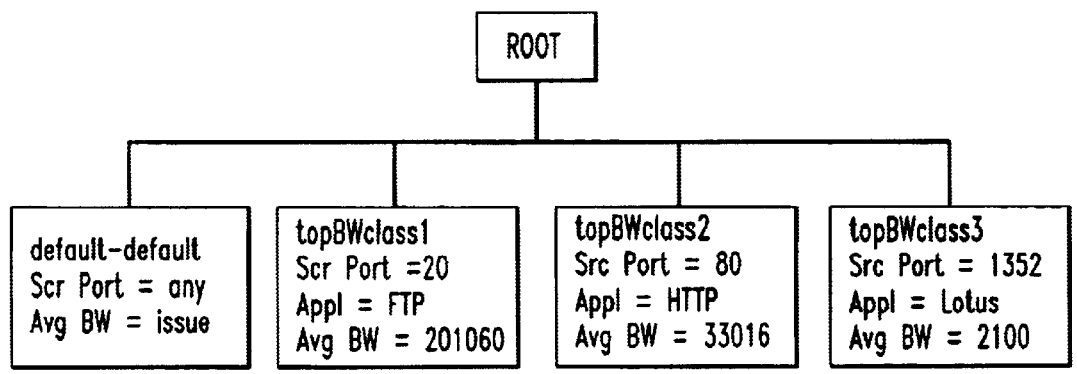
FIG. 4 is an exemplary traffic classification tree for storing parameters related to traffic classes when client input is not available.

FIG. 4 shows an example of the traffic classification tree, derived via data analysis of the top bandwidth consuming source ports, when client input is not available. For illustration, FIG. 4 assumes that (1) top bandwidth consuming ports are used; and (2) the number of ports in use in the communication link are less than 10 from the post collection data analysis. Based on the data analysis, the physical bandwidth of the communications link, indicated as the root, the three highest bandwidth-consuming (or "busiest") source ports were arbitrarily chosen for bandwidth allocation. They are respectively port 20 (for FTP communication), port 80 (HTTP), and port 1352 (Lotus). Traffic from all the other ports in the link are collected together in the "default" class.

Accordingly, after the traffic classes and corresponding parameters have been determined, the resource managing device 116 can then allocate differing amounts of network resources to the data traffic of the different classes. Therefore, classes of traffic which have been designated as having a higher importance can receive a sufficient amount of available resources "guaranteed" to those classes in order to decrease the probability that they will be delayed.

In operation, the communications link 119 has a finite amount of network resources which can be allocated between numerous types of network traffic. For example, the terminals 102, 104 and 120 within the local network 110 may provide data services to global network terminals 106, 108 which are not directly connected with the local network 110. Furthermore, the terminals 102, 104 and 120 within the local network 110 may be used by terminals in other local networks that are directly connected with the local network 110 (e.g., via a dedicated communications channel) for network data transfers, such as video conferencing, e-mail or the like. At a point in time when the demand for network resources exceeds the communications link 119's supply of resources, the communications link 119 can become congested and backed up due to the excess network resource demands. Accordingly, the back up may cause delay in the travel times or loss of data from the local network 110. The congestion in the communications link 119 can also cause delay of data traffic in the global network 112 since a portion of the global network traffic may need to travel to the local network 110.

Without the resource managing device 116 to apportion the network resources, the delay can affect all data traffic equally. This can be the case even though the non-time sensitive portion of the traffic to or from the local network 110 may not be detrimentally affected by the delay, while the time sensitive portion of the data traffic will be negatively affected by the delay. Accordingly, the resource managing device 116 can allocate network resources, such as bandwidth, to the various traffic classes in order to minimize the delay of the time sensitive traffic classes.

To efficiently configure the different traffic into specific traffic classes, certain traffic class configuration knowledge may be required. For example, the apportioning of the network resources for a communications link 119 may be different for each traffic flow direction (inbound vs. outbound). As an example, consider a file retrieval, a request that goes from the requester to the file server may be small relative to the response (i.e., the file) received back from the file server. Accordingly, for the request traffic going to the file server, there may not need to be any bandwidth guarantee in the communications link 119, whereas for response traffic (the file) that goes back to the requester, there should be some amount of bandwidth guaranteed.

Moreover, a traffic class can consist of a number of flow aggregates each of which may not be specified by the same classification parameters of the 5-tuples. For example, a flow aggregate A may designate all traffic specified by a destination port number, while a flow aggregate B may designate all traffic specified by a source port number. Hence there could be issues in configuring specific resource managing devices 116 to recognize that the different flow aggregates actually belong to the same traffic class, and therefore share the same bandwidth guarantee for that traffic class.

In order to displace the need to employ people who must be skilled or have expertise in configuring and using the off-the-shelf technology, the traffic class configuration knowledge can be converted into a set of engineering rules so that the traffic class configuration of the resource managing device 116 can be automated. The Appendix B of this patent shows an exemplary list of engineering rules for transforming a class hierarchy tree into a Class of Service (CoS) traffic classification tree (one for each traffic flow direction, inbound and outbound) that a resource managing device 116 can understand. The following is a brief description of selected rules.

Rule 1 ensures that all sibling traffic classes of a parent (traffic class) are specified with identical classification parameters. These parameters include: source port, source IP address, destination port, destination IP address, and protocol. The following is an example that is not allowed: traffic class A is specified by source port and source IP address, and a sibling class B is specified by destination port and destination IP address. Accordingly, class A and class B cannot be siblings traffic classes because they are specified by different classification parameters. The following is an example that is allowed: both sibling traffic classes A and B are specified by source port and protocol.

Rules 2 and 3 ensure that a separate tree is specified in each direction: inbound and outbound. Rule 4 maintains that a default class can be added at each tree level (other than the root) as a "catch-all" for all unclassified traffic at each level. Rule 5 introduces the notion of a "null" traffic class which can be used to remedy situations where (1) children of an original parent traffic class have different classification parameters, and therefore cannot be siblings of the same parent, or (2) to group a set of discontinuous IP addresses together. Rule 6 gives guidelines for the configuration of descendants traffic classes of a particular ancestor traffic class. The ancestor traffic class could be the parent or grandparent of a descendent node, depending on whether or not the descendants all have identical traffic classification parameters. Rules 7–9 specify guidelines for the truth assignment of the "bounded" variable for a traffic class. Rule 10 gives guidelines on the allocation of bandwidth for the route.

Figure 5:
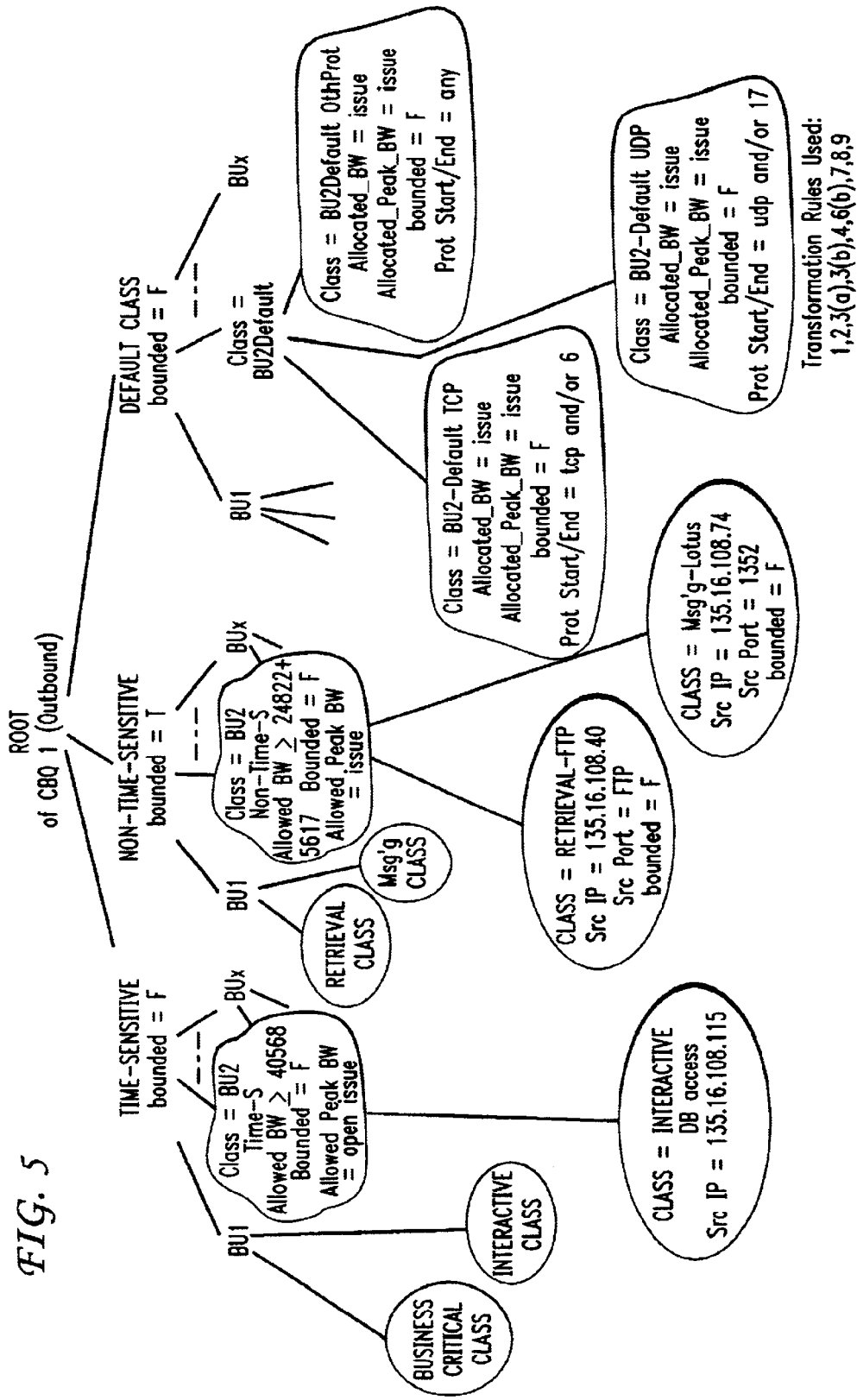
FIG. 5 is an exemplary traffic classification tree of outbound data traffic.
Figure 6:
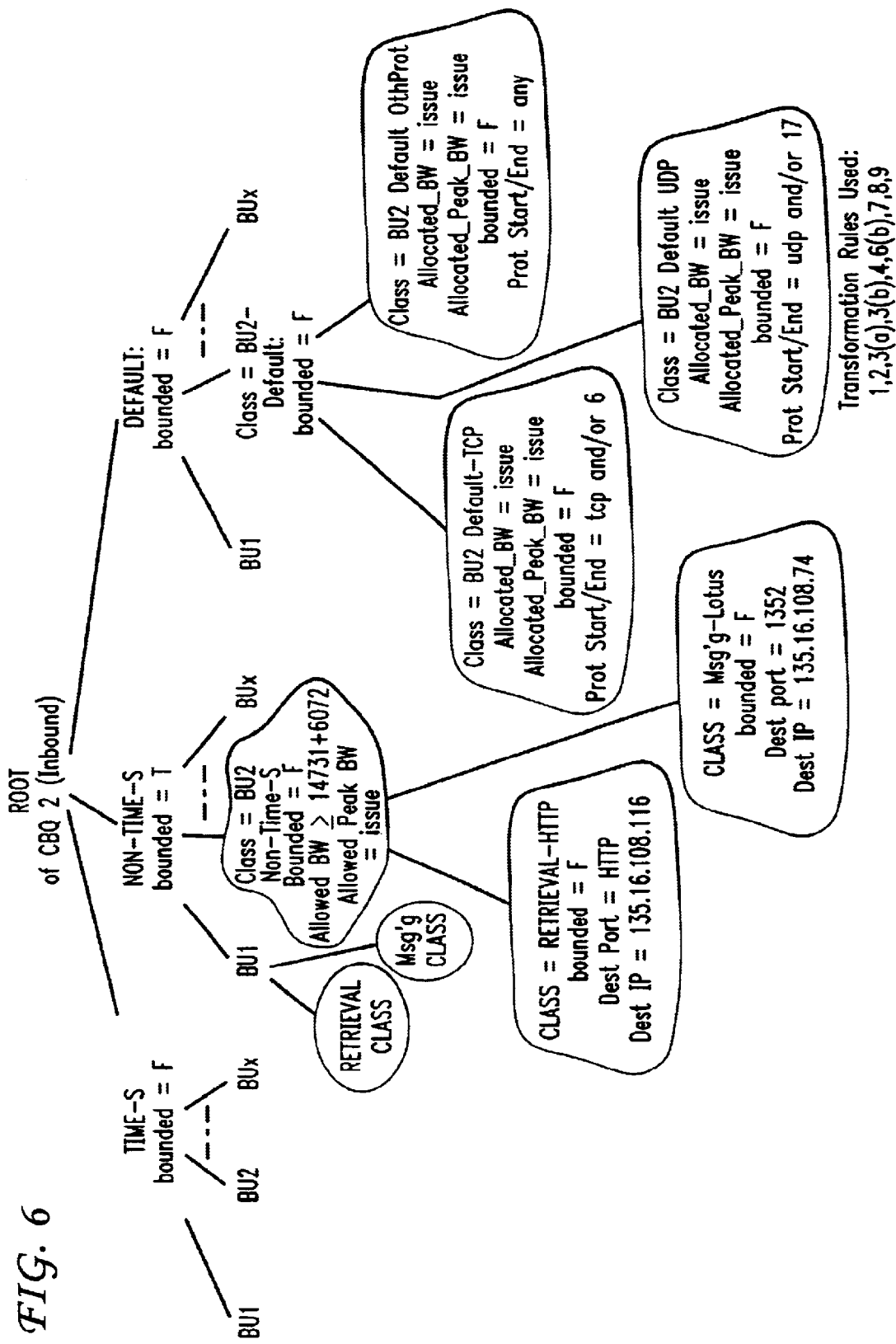
FIG. 6 is an exemplary traffic classification tree of inbound data traffic.

FIG. 5 and FIG. 6 show the resultant "outbound" and "inbound" trees, respectively, for the traffic on BU2. FIGS.

5 and 6 are derived by using the "Class Hierarchy Tree" of FIG. 3, and the set of engineering rules in the Appendix B.

It is important to note that, for this "BU2" example, the direction of the traffic flow for the traffic that must have bandwidth guaranteed is obtained during the interview with the client. For example, in the interactive traffic class database access, the client has specified that the database server in the company is accessed via queries by remote end users for retrieval of large sized records (refer to the example traffic list above). Therefore, for this traffic class, the bandwidth should be guaranteed in the outbound direction from the server, but not the inbound direction since traffic generated by incoming database queries are relatively small.

This example is shown in FIG. 5 for the outbound direction under the traffic class "interactive database access" within the "time-sensitive" branch. Since the inbound traffic associated with the same traffic class (consisting of only small queries) does not need any bandwidth guaranteed, it is non-existent in FIG. 6 for the inbound direction for the traffic class under the "time-sensitive" branch. By doing so, engineering rules 2 and 3 of Appendix B have been followed. Likewise, all other traffic classes in the traffic list shown for BU2 above are similarly configured as part of the outbound and inbound traffic classification trees in FIGS. 5 and 6, respectively, by following the applicable engineering rules.

FIGS. 7a and 7b, respectively show an exemplary data structure of memory 206. The "outbound" and "inbound" data structures, 700, 750, respectively, correspond to the "outbound" and "inbound" trees of FIGS. 5 and 6 above. Tables 700 and 750 show a listing of exemplary classes of traffic and corresponding parameters used to describe each class of traffic. The abbreviation NA, not applicable, signifies that there is no traffic of a particular class (for BU2) in the traffic flow direction indicated for the table.

Referring first to FIG. 7a, the field 702 contains the various classes of data traffic which can be defined to travel across the local network 110 and/or communication link 119. For example, the first class is a "business critical/jitter sensitive" traffic class. As noted, this is a time-sensitive class of traffic because any delay in the delivery of this class of data traffic can result in a decreased quality of the data transmission. Examples of the business critical/jitter sensitive classes of traffic may include voice over IP telephony, trading, video-teleconferencing, or the like.

The second class listed in field 702 is an "interactive/ delay sensitive" traffic class. Again, as noted this is a time sensitive class of traffic because any delay in the delivery of data results in a degradation of the quality of the transmission. Examples of interactive/delay sensitive data types include Telnet, SNA, Web-browsing, directory and database queries, SAP R/3, or the like.

The third class listed in field 702 is a "retrieval" traffic class. As noted, this is a non-time sensitive class of traffic because delay in the delivery of this class of information/ data does not directly result in a decrease of quality of the data transmission. Examples of the retrieval class of traffic may include file transfer protocol (FTP), web file-downloads, or the like.

The fourth class listed in field 702 is a "messaging" traffic class. The messaging class is a non-time sensitive class of traffic because delay in its delivery does not directly degrade the data transmission. Examples of the messaging class of traffic may include e-mail, collaborative computing (i.e., Lotus Notes) or the like.

Finally, the fifth class listed in field 702 is a default class of traffic. As noted, this is a non-time sensitive class of traffic because delay does not directly affect the traffic's quality from a user's perspective. Examples of default classes of traffic include unclassified TCP, unclassified UDP or the like.

While FIGS. 7a and 7b describe only five different types of traffic classes, it is to be understood that numerous other traffic classes may be defined as needed without departing from the spirit and scope of the present invention.

Field 704 contains the ancestor class corresponding to the traffic class in field 702. The ancestor class can be obtained by traversing up the class hierarchy tree to a point that is one level below the root node. For example, to obtain the ancestor class for the retrieval class in field 702, the "outbound" traffic classification tree in FIG. 5 can be traversed upwardly until one level below the root node is reached, the non-time-sensitive class.

Field 706 contains a BOOLEAN variable related to the resource managing device 116 for indicating whether a particular class is bounded (T) or not bounded (F). The BOOLEAN value in field 706 can be selected by the network operator, or by the type of the traffic class. For example, by setting the bounded variable of a class to not bounded (F), the resource managing device 116 permits the data traffic and the corresponding class to use all additional bandwidth which is currently unused by another class or other classes. Accordingly, unbounded means that a class of traffic can borrow unused bandwidth from other traffic classes through its immediate parent node. In contrast, if the traffic class is bounded (T) the data traffic in the corresponding class is not permitted to exceed beyond the bandwidth which the class has been allocated (via the bandwidth allocation formula, explained below in field 720). This is true even if there exists excess bandwidth that is not being used by any other class of traffic in the same communication medium.

It is important to note that this BOOLEAN variable is settable/applicable for every node of a traffic classification tree (inbound or outbound). Accordingly, for example, if a traffic class A is "unbounded" (i.e., bounded=F), then the traffic class A may borrow any "left-over" bandwidth from its sibling(s) through its parent B. It is important to note that the sole function of the parent node is to apportion bandwidth that is allocated to itself to dependent children nodes of the parent. The parent will know if A's siblings have "left-over" bandwidth or not. Moreover, if parent B's bounded variable is set to "T", then A could only borrow unused bandwidth from its sibling(s) through parent node B and no other node.

If, however, parent node B's "bounded" variable is "F", parent node B can then borrow from B's own sibling(s) through B's parent C (i.e., C would be A's grandparent) if the combined bandwidth demand of B's children nodes exceeded the bandwidth that B is allocated. In this way, an "unbounded" traffic class A can borrow bandwidth from other traffic classes in the tree, from the same branch or from other branches through its parent and/or ancestor nodes, all the way up to the root level of the tree, so long as each of the higher ancestors of A is also not bounded. However, if any higher ancestors of A, say D, are bounded, then if A is unbounded, A can borrow up to the tree level of D. In other words, A can borrow from other descendants' traffic classes of D (that D can reach from a "downward" direction), but not any other "branches" that D cannot reach in a "downward" mode, e.g., D's sibling(s) and the associated tree branches of the sibling(s).

In all cases, A can only borrow up to the limit of the allocated peak bandwidth utilization value set for the traffic class. Such "allocated peak bandwidth" limits could be determined by client input based on the client's business policy, or by network modeling. In this manner, the resource managing device 116 can flexibly maximize the use of the communications link 119 while maintaining proper bandwidth allocation for all of the traffic classes.

The choice to bound or not to bound a traffic class from borrowing bandwidth depends on several factors: client input, or engineering judgment with respect to the "overall effect of borrowing" to all the other traffic classes in the link (or schematically, in the classification tree). For example, the judgment to allow borrowing for a particular traffic class should always guide against the possibility of a non-time-sensitive class "hogging" the "borrowed" bandwidth from a time-sensitive class for a long period of time, which, if not prevented, could result in negative performance impact to a time-sensitive traffic class. In addition, it can also lead to the possibility of "starvation" for any other traffic class in the link that may have no bandwidth allocated to it at all, but is depending on purely "borrowing". The engineering judgment part has been converted into a set of "Engineering rules" derived for the configuration of the resource management device 116. (See Appendix B, Rules 7–9).

Field 708 is the allocated bandwidth value for the parent of an associated traffic class. The total allocated average bandwidth value for a parent must be at least the sum of the allocated average bandwidth of all of its children. For example, the value for the parent of both the Retrieval-FTP class and the Messaging-Lotus class (i.e., BU2 Non-Time-Sensitive, see FIG. 5) is at least the sum of the allocated average bandwidth for the two corresponding children classes (24,822 is the allocated average bandwidth for the Retrieval-FTP class and 5,617 is the allocated average bandwidth for the Messaging-Lotus class). The calculations for the individual allocated average bandwidth of a child traffic class is explained in the description for field 720 below.

Field 710 is the bounded BOOLEAN variable for the parent class. The description of this variable is similar to the description for field 706 above. For example, the variable in field 710 is set to "F" for the "Messaging-Lotus" and "Retrieval-FTP" traffic classes, both classes have one same parent (FIG. 5). Since the bounded variables for both classes are set to "F" (field 718), this allows the parent ("BU2 Non-Time-Sensitive") to borrow any left-over bandwidth from its own parent (which in this case is the ancestor class "Non-Time-Sensitive" which is the grandparent of both the "Retrieval-FTP" and "Messaging-Lotus"), should the combined bandwidth demand of its children traffic classes (Retrieval-FTP and Messaging-Lotus) exceed its allocated average bandwidth (field 708). However, since the ancestor class "Non-Time-Sensitive" is bounded (field 706), no borrowing is allowed. Accordingly, if the combined bandwidth demand of "BU2 Non-Time-Sensitive's" children, i.e., all of the Non-Time-Sensitive classes from BU1 through BUX, exceeded its own allocated average bandwidth value to (which again must be at least the sum of the allocated bandwidth of its children), then traffic from children classes must wait until enough bandwidth is available before it can be transported through the communications medium.

Field 712 contains the peak-bandwidth utilization corresponding to each of the traffic classes in field 702. The peak bandwidth utilization can be measured in bits per second (bps) and is defined as: the highest level of usage (or maximum data burst rate) in bits per second that a flow aggregate or a traffic class attains in all the 1-second samples over the traffic collection period through a communications medium. For example, the peak-bandwidth utilization of the interactive/delay sensitive traffic class is 42,399 bps.

Field 714 contains the average bandwidth utilization in bits per second (bps) for each selected class of traffic. The average bandwidth utilization is defined as: the average level of usage (or average data transmission rate) in bits per second a flow aggregate, or a traffic class attains in all 1-second samples over the traffic collection period through a communication medium. In particular, the average bandwidth utilization can be represented by the following formula:

$$\frac{\sum_{k=1}^{Y} X_k}{Y}$$

where Y=the total number of 1-second intervals in the traffic collection period, and $X_k$=the sum of the number of bytes of all flow aggregates within the class collected in a 1-second interval. For example, the average bandwidth utilization of the interactive/delay sensitive traffic class is 36,294 bps.

The peak-bandwidth utilization values in field 712 and the average bandwidth utilization values in field 714 can be determined from a prior use data collection which includes data on the historical use of the communications link 119. The prior use data can include data corresponding to the type of data traffic and the volume of the various data traffic utilizing the network 110 and/or communication link 119. Once gathered, the prior use data can be used to compile the various data traffic into traffic classes having the corresponding measured parameters shown in fields 712 and 714. As a by-product of the traffic data analysis and traffic load derivation, a set of traffic assessment graphs can be generated for client consumption.

Gathering the prior use data requires access to a record of the actual historical use of the communications link 119 over a prior period of time. For example, the use of a public domain software tool, such as TCPdump, can be used to gather the prior use data. The TCPdump software tool can automatically extract prior use data in the form of data packet headers from a communications link, the packet header includes numerous parameters on the individual data transmissions sent through the link. These packet parameters can include a timestamp, IP addresses (source and destination), port number (source and destination) and protocol used, and the total number of bytes in the packet, including TCP and IP overhead bytes. It is to be understood that other alternative well known off-the-shelf and relatively much more expensive products, such as the NetScout probe, may be used for gathering the prior use data.

Accordingly, once the prior use data has been collected it can be compiled to filter out only the "relevant" traffic the bandwidth of which must be guaranteed if client input is available, or only the "top bandwidth consuming" traffic based on analysis of collected data, if client input is not available. In either case, a classification tree is derived, as previously described.

Field 716 contains an α parameter that is assigned to each of the IP traffic classes. The α parameter is a weighted factor for each of the traffic classes that varies between "0" and "1" depending upon the traffic class' sensitivity to delay. For example, a class of traffic that is very time sensitive (business critical/jitter sensitive class) would have an α that is close to "1" (i.e., between 0.7–1.0), while a class of traffic which is not as sensitive to time delay (retrieval class) would have an α between 0.1–0.5. For example, as shown in field 716 the α value of Interactive/Delay Sensitive data traffic is 0.7, while the α value of the Retrieval data class is 0.5.

It should be noted that while the weighing factor is a function of the degree of sensitivity to delay for a traffic class or a popular application, it may also be determined based on a network operator (client's) input, as previously mentioned. For example, a network operator may wish to assign a particular type of data traffic a high α value (so that this traffic can have enough guaranteed bandwidth to burst to or near its peak rate) even when the functional nature of the traffic type itself would suggest that it should have a lower α value.

When client input is not available for α value assignment, "best guess" α values are used according to the known functionality of the traffic class. For example, a "familiar" FTP port could be assigned a "suggested" α of 0.3. For HTTP ports, a suggested α of 0.8 could be used and an α of 0.2 could be assigned to "Lotus" port traffic (See FIG. 4).

Field 718 contains a "bounded" BOOLEAN variable for the associated traffic classes.

Field 720 contains the allocated average bandwidth for each of the corresponding traffic classes in field 702. The allocated average bandwidth is calculated from the measured parameters which have been derived from the prior use data in fields 712 and 714 along with the selected α parameter in field 716. The allocated average bandwidth in field 720 and the BOOLEAN variable in field 718 can constitute a network performance specification which may be used by the resource managing device 116 to allocate network resources. Furthermore, the allocated average bandwidth is defined by the formula:

$$\alpha*\text{Peak}+(1-\alpha)*\text{Mean}$$

where the α parameter corresponds to the value in field 716, the Peak value corresponds to the value in field 712, and the Mean value corresponds to the value in field 714.

As described above, the value in the allocated bandwidth field 720 can be included in the network performance specification to instruct the resource managing device 116 on how to divide the available bandwidth on communication link 119 between the various classes of traffic. For example, the "unbounded" interactive/delay sensitive, class of traffic would be allocated up to the parent's allocated bandwidth limit by borrowing strictly from the parent, which is at least 40,568 bps of bandwidth on the communication link 119. Since this time-sensitive traffic usually peaks at 42,399 bps, we ensure that over 95% of the bandwidth needed to allow this traffic class to burst (or peak) will be allocated to the class, so that the "interactiveness" of this class could be largely retained. Similarly, because the bounded variable is set to "F" for the "Retrieval-FTP" traffic class, it would be allowed to borrow up to the parent's allocated limit. It is important to note that the parent ("BU2 Non-Time-Sensitive") is in turn allocated a limit that is at least the sum of the allocated average bandwidth of both of its children. As shown in Field 708, 24,822 is the bandwidth amount obtained for the "Retrieval-FTP" traffic class, and 5,617 is the bandwidth amount obtained for the "Messaging-Lotus" traffic class, by using the allocated average bandwidth formula explained above.

FIG. 7b shows an exemplary data structure 750 of the memory 206 for inbound traffic corresponding to FIG. 6. The fields 752–770 of data structure 750 directly correspond to the field 702–720 of the data structure 700.

It is important to note that data structure 750 reflects changes in the network resource allocation from the outbound traffic of data structure 700. For example, the "interactive database access" traffic class within the "time-sensitive" ancestor class does not have any corresponding parameters or allocated bandwidth. As described above, for this example, since the inbound traffic associated with the traffic class does not need any bandwidth guaranteed, it is non-existent in FIG. 6 and data structure 750 for the inbound direction of the traffic class under the "time-sensitive" branch. Similarly, there is no "Retrieval-FTP" traffic class traffic that must be guaranteed for the inbound direction, since the traffic only consists of file retrieval by request to the FTP file server, only the outbound direction of traffic should be guaranteed. Hence, it is also non-existent in FIG. 6 and in the data structure 750 under the "non-time-sensitive" branch.

In both FIGS. 7a and 7b, the "allocated bandwidth for parent" and "α value" fields are filled in to provide examples only for the three default traffic classes of "BU2-Default TCP", "BU2-Default UDP" and "BU2-Default Other Protocol". The assignment of these values is beyond the scope of engineering, often involving the client's business policy arrangement and business needs. Therefore, these values can be determined only by agreement with the client and/or with the aid of network modeling.

Figure 8:
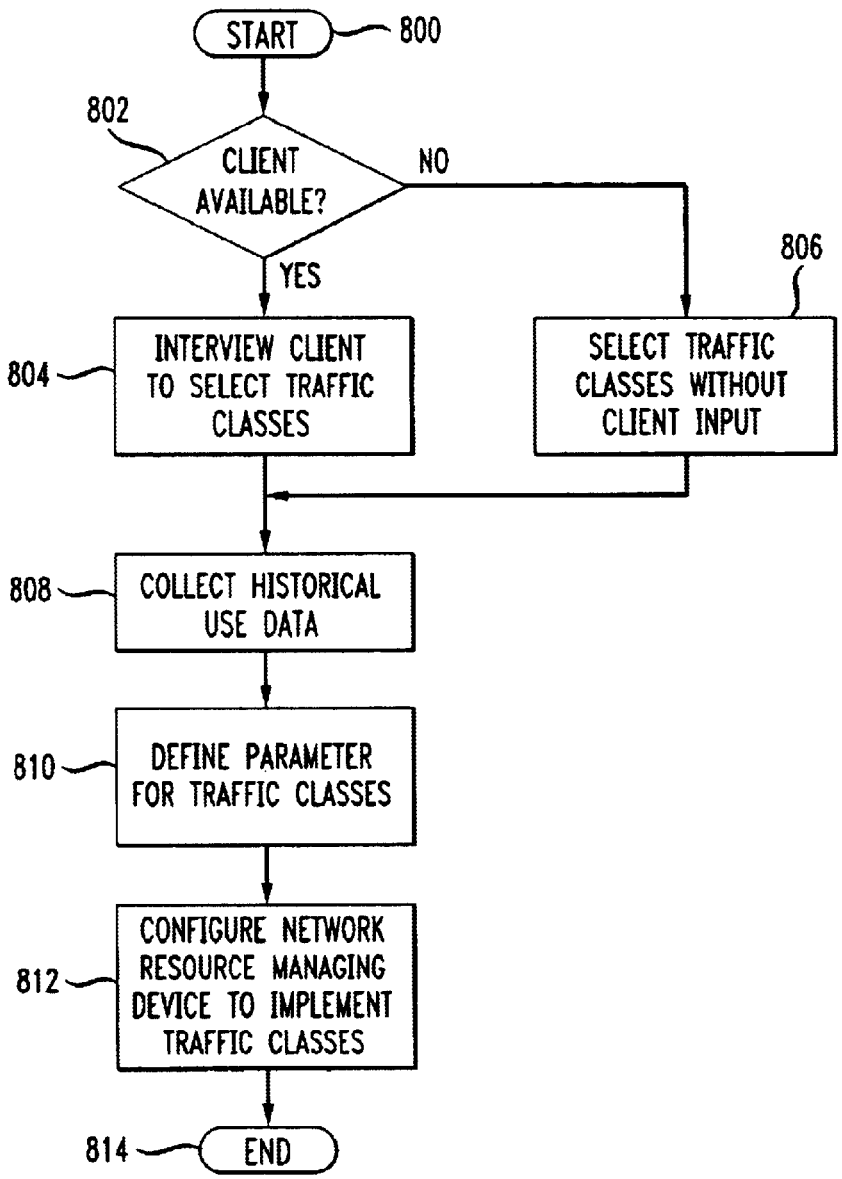
FIG. 8 is a flowchart outlining an exemplary process of the resource managing device in accordance with the present invention.

FIG. 8 shows a flowchart outlining an exemplary process of gathering information necessary to develop a bandwidth allocation scheme and implementing the bandwidth allocation scheme in a resource managing device. The process begins in step 800 and proceeds to step 802. In step 802, a determination is made as to whether a client is available to provide information regarding the use of a communication link of a network. If the client is available, the process proceeds to step 804; otherwise, the process proceeds to step 806 where traffic classes are selected without client input. As described above, the traffic classes can be selected without client input based on the historical use of the network.

In step 804, the client is interviewed in order to select the traffic classes. As described above, the interview process can include a series of questions as shown in Appendix A of this patent. The process then proceeds to step 808.

In step 808, historical use data of the communication link is collected. Collecting of the historical use data may be accomplished by the use of a software tool, such as TCP dump. The process then proceeds to step 810.

In step 810, a set of traffic load parameters are defined for each traffic class based on the historical use data gathered in step 808. The process then proceeds to step 812.

In step 812, a network resource managing device is configured based on the parameters for each class which were defined in step 810 and the engineering rules listed in Appendix B. Based on the parameters and the rules for the traffic classes, the network resource managing device may implement the traffic classes over a link of a network. The process then proceeds to step 814 where the process ends.

Variations of this exemplary process can be designed to adapt to a particular clients' situation. For example, a client may not be available during the first site visit for an interview. In this case, the data collection can be done and an initial traffic classification scheme can be designed. This initial result can then be used as the basis for discussion with the client on a second visit during which the actual interview takes place. Accordingly, the process as depicted in FIG. 8 is not intended to be limiting, but only an example of operation.

As shown in FIG. 2, the method of this invention is preferably implemented on a programmed processor. However, the network resource managing device 116 can also be implemented as part of a switch or a stand alone on a general purpose or a special purpose computer, a programmed microprocessor or microcontroller and peripheral integrated circuit elements, an Application Specific Integrated Circuit (ASIC), or other integrated, a hardware electronic or logic circuit such as a discrete element circuit, a programmable logic device such as a PLD, PLA, FPGA, or PAL, or the like. In general, any device on which exists a finite state machine capable of implementing the exemplary flowcharts shown in FIG. 8 can be used to implement the network resource managing device 116 functions of this invention.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A method for operating a network, comprising:
   receiving from a client one or more network use specifications;
   grouping data traffic for the client into a set of traffic classes based on traffic type and the network use specifications, wherein the traffic classes are grouped into a class hierarchy tree including a root node and a second level of nodes below the root node and a second level of nodes below the root node in the class hierarchy tree, the second level of nodes including at least one of a time-sensitive, non-time-sensitive and default node; and
   allocating network resources to the data traffic based on the set of traffic classes to provide a class of service.

2. The method according to claim 1, wherein each of the second level nodes further includes at least one business unit node on a third level below each respective second level nodes in the class hierarchy tree.

3. The method according to claim 2, wherein each of the business unit nodes further include at least one of the traffic classes on a fourth level below each respective business unit node in the third level of the class hierarchy tree.

4. The method according to claim 3, wherein each of the traffic classes includes an allocated bandwidth which each of the traffic classes is permitted to use on the network.

5. The method according to claim 4, wherein the allocated bandwidth is a portion of a bandwidth available on the network and is based on at least a peak bandwidth utilization and a mean bandwidth utilization corresponding to each of the traffic classes.

6. The method according to claim 5, wherein the allocated bandwidth is further based on an alpha value, the alpha value being an indication of the sensitivity to delay of the respective traffic class.

7. The method according to claim 4, wherein each of the traffic classes further includes a bounded variable that indicates a bounded or unbounded state of the traffic class, wherein when a traffic class is in the unbounded state, the traffic class can use any excess allocated bandwidth of other traffic classes which depend from a same parent node, and when the traffic class is in a bounded state, the traffic class can use only the allocated bandwidth of that traffic class.

8. The method according to claims 4, wherein each of the business unit nodes further includes a bounded variable that indicates a bounded or unbounded state of the business unit, when a business unit node is unbounded the business unit may additionally use the network resources of other business unit nodes which depend from a same parent node, and when a business unit node is bounded, the business unit node may only use the allocated network resources for that business unit node.

9. The method according to claim 4, wherein each of the second level nodes further includes a bounded variable that indicates a bounded or unbounded state of the node, when a second level node is unbounded, the node may additionally use the network resources of other second level nodes, and when a second level node is bounded, the node may only use the allocated network resources for that second level node.

10. The method according to claim 1, wherein the network use specification is generated from a set of client preferences gathered from the client by at least one of a client interviewing process and a client questioning process.

11. The method according to claim 10, wherein the network use specification further includes prior use data of the network.

12. The method according to claim 1, wherein the network use specification is generated from a history file containing prior use data of the network, the prior use data being organized into the traffic classes based on a degree of network resource consumption.

13. The method according to claim 12, wherein allocating network resources further includes generating a network control program that allocates the network resources between the data traffic based on the set of traffic classes and the history file to provide guaranteed class of service to these traffic types.

14. The method according to claim 12, wherein the network use specification can be flexibly generated with or without input from a client.

15. The method according to claim 14, wherein the network control program apportions the network resources between the data traffic based on the set of traffic classes to provide a differentiated bandwidth treatment according to a client's priority on the data traffic when the client's input is available, and a guaranteed bandwidth treatment and class of service on the data traffic when a client's input is not available.

16. The method according to claim 14, further comprising generating a network control program that includes using a set of engineering rules and a minimal set of service provisioning tools to provide at least one of a differentiated bandwidth treatment and quality of service according to a client's priority of the data traffic when client's input is available, and a guaranteed bandwidth treatment and class of service on the data traffic when a client's input is not available.

17. The method according to claim 12, wherein each of the traffic classes includes an allocated bandwidth which each of the traffic classes is permitted to use on the network.

18. The method according to claim 17, wherein the allocated bandwidth is a portion of a bandwidth available to the network and is based on at least a peak bandwidth utilization and a mean bandwidth utilization corresponding to each of the traffic classes.

19. The method according to claim 18, wherein the allocated bandwidth is further based on an alpha value, the alpha value being an indication of the sensitivity to delay of the respective traffic class.

20. The method according to claim 17, wherein each of the traffic classes further includes a bounded variable that indicates a bounded or unbounded state of the traffic class, wherein when a traffic class is in the unbounded state, the traffic class can use the allocated bandwidth of other traffic classes which depend from a same parent node, and when the traffic class is in a bounded state, the traffic class can use only the allocated bandwidth of that traffic class.

21. The method according to claim 20, wherein allocating the amount of network resource further includes configuring a network resource controller and setting the bounded variable based on an engineering judgment on the bandwidth required by the traffic type when the client input is not available.

22. A method for optimizing network performance, comprising:

receiving from a client one or more network use specifications;

classifying data traffic for the client into one of a plurality of traffic classes based on one or more network use specifications and available network resources of the network, wherein the traffic classes are grouped into a class hierarchy tree including a root node and a second level of nodes below the root node and a second level of nodes below the root node in the class hierarchy tree, the second level of nodes including at least one of a time-sensitive, non-time-sensitive and default node; and controlling an amount of network resources that the data traffic can use based on the traffic class of the data traffic to produce a quality of service for each of the traffic classes.

23. The method according to claim 22, wherein each of the traffic classes includes an allocated bandwidth which each of the traffic classes is permitted to use on the network.

24. The method according to claim 23, wherein the allocated bandwidth is a portion of a bandwidth available to the network and is based on at least a peak bandwidth utilization and a mean bandwidth utilization corresponding to each of the traffic classes.

25. The method according to claim 24, wherein the allocated bandwidth is further based on an alpha value, the alpha value being an indication of the sensitivity to delay of the respective traffic class.

26. The method according to claim 23, wherein each of the traffic classes further includes a bounded variable that indicates a bounded or unbounded state of the traffic class, wherein when a traffic class is in the unbounded state, the traffic class can use the allocated bandwidth of other traffic classes which depend from a same parent node, and when the traffic class is in a bounded state, the traffic class can use only the allocated bandwidth of that traffic class.

27. The method according to claim 22, wherein the network use specification is generated from a set of client preferences gathered from a client by at least one of a client interviewing process and a client questioning process.

28. The method according to claim 27, wherein the network use specification further includes prior use data of the network.

29. A method for operating a network, comprising:

collecting from a client prior use data of the network;

generating a network performance specification for the client based on the prior use data, the network performance specification including at least a plurality of traffic classes and traffic parameters, wherein the traffic classes are grouped into a class hierarchy tree including a root node and a second level of nodes below the root node and a second level of nodes below the root node in the class hierarchy tree, the second level of nodes including at least one of a time-sensitive, non-time-sensitive and default node; and allocating network resources to the data traffic based on the network performance specification.

30. The method according to claim 29, wherein each of the traffic parameters include an allocated bandwidth which each of the traffic classes is permitted to use on the network.

31. The method according to claim 30, wherein the allocated bandwidth is a portion of a bandwidth available on the network and is based on at least a peak bandwidth utilization and a mean bandwidth utilization corresponding to each of the traffic classes.

32. The method according to claim 31, wherein the allocated bandwidth is further based on an alpha value, the alpha value being an indication of the sensitivity to delay of the respective traffic class.

33. The method according to claim 30, wherein each of the traffic parameters further includes a bounded variable that indicates a bounded or unbounded state of the traffic class, wherein when a traffic class is in the unbounded state, the traffic class can use the allocated bandwidth of other traffic classes which depend from a same parent node, and when the traffic class is in a bounded state, the traffic class can use only the allocated bandwidth of that traffic class.

34. The method according to claim 29, wherein the network performance specification is generated from a set of client preferences gathered from the client by at least one of a client interviewing process or a client questioning process.

35. The method according to claim 34, wherein the network performance specification further includes prior use data of the network.

* * * * *